US012670755B1

(12) United States Patent
Curelar

(10) Patent No.: US 12,670,755 B1
(45) Date of Patent: Jun. 30, 2026

(54) SYSTEM AND METHODS FOR ACCESS CONTROL

(71) Applicant: PAZNIC LLC, Hueytown, AL (US)

(72) Inventor: Jonathan Curelar, Hueytown, AL (US)

(73) Assignee: PAZNIC LLC, Hueytown, AL (US)

( * ) Notice: Subject to any disclaimer, the term of this patent is extended or adjusted under 35 U.S.C. 154(b) by 0 days.

(21) Appl. No.: 19/023,985

(22) Filed: Jan. 16, 2025

Related U.S. Application Data

(63) Continuation of application No. 18/386,521, filed on Nov. 2, 2023, now Pat. No. 12,205,426, which is a continuation of application No. 18/107,674, filed on Feb. 9, 2023, now Pat. No. 11,810,411, which is a continuation of application No. 17/666,263, filed on Feb. 7, 2022, now Pat. No. 11,580,805, which is a continuation of application No. 16/822,815, filed on Mar. 18, 2020, now Pat. No. 11,282,317.

(51) Int. Cl.
*G07C 9/00* (2020.01)
*E05G 1/08* (2006.01)
*E05G 1/10* (2006.01)
*G07C 9/26* (2020.01)

(52) U.S. Cl.
CPC ........... *G07C 9/00912* (2013.01); *E05G 1/08* (2013.01); *E05G 1/10* (2013.01); *G07C 9/26* (2020.01)

(58) Field of Classification Search
CPC ........ G07C 9/00912; G07C 9/26; E05G 1/08; E05G 1/10
USPC .......................................................... 235/379
See application file for complete search history.

(56) References Cited

U.S. PATENT DOCUMENTS 4,792,270 A * 12/1988 Yoshida .................. G07F 17/12 700/214
5,475,376 A * 12/1995 Chikamitue ............ G07F 17/12 340/5.73
7,437,755 B2 10/2008 William et al.
7,607,573 B1 * 10/2009 Gromley ............ G07C 9/00944 235/382

(Continued)

OTHER PUBLICATIONS

Application Notes—Access Control; Yorkland Controls—Environmental Solutions; Jan. 5, 2007; pp. 1-14.

(Continued)

*Primary Examiner* — Michael G Lee
*Assistant Examiner* — David Tardif
(74) *Attorney, Agent, or Firm* — Jake M. Gipson; Bradley Arant Boult Cummings LLP

(57) ABSTRACT

A system for controlling access to a secure room containing a plurality of safety deposit boxes, comprises a motion detector, a biometric sensor, and a plurality of contact sensors, wherein each of the safety deposit boxes is associated with at least two contact sensors. The system includes a processor that is configured to unlock the gate when a plurality of access conditions are satisfied, which may include: collecting via the biometric sensor a biometric sensor a biometric credential that matches a reference biometric credential in a user database; and determining the secure room is unoccupied based on at least a predetermined period of no motion detected by the at least one motion sensor. The processor may also be configured to generate a box-accessed event identifying one of the safety deposit boxes when all of the contact sensors associated with that safety deposit box are simultaneously opened.

19 Claims, 2 Drawing Sheets

(56) References Cited

U.S. PATENT DOCUMENTS

| | | | | |
|---|---|---|---|---|
| 7,653,945 | B2 | 1/2010 | Serani et al. | |
| 7,752,652 | B2 | 7/2010 | Prokupets et al. | |
| 8,207,815 | B2 | 6/2012 | Newman et al. | |
| 9,558,604 | B2 | 1/2017 | Robertson et al. | |
| 2002/0063154 | A1 | 5/2002 | Hoyos et al. | |
| 2007/0256615 | A1* | 11/2007 | Delgrosso | E05G 1/08 109/23 |
| 2011/0181413 | A1* | 7/2011 | Hamm | E05G 1/08 340/541 |
| 2016/0010384 | A1* | 1/2016 | Zhang | H01Q 1/36 235/379 |
| 2019/0096210 | A1 | 3/2019 | Graene et al. | |
| 2019/0244492 | A1 | 8/2019 | Horgan et al. | |
| 2020/0327335 | A1* | 10/2020 | Khan | G06V 40/107 |

OTHER PUBLICATIONS

ONGUARD "Integrated Security Management Software" 2015 Lenel Systems International, Inc.; pp. 1-4.

* cited by examiner

SYSTEM AND METHODS FOR ACCESS CONTROL

CROSS-REFERENCE TO RELATED APPLICATIONS

This application is a continuation under 35 U.S.C. § 120 of U.S. application Ser. No. 18/386,521, filed Nov. 2, 2023, which is currently pending. U.S. application Ser. No. 18/386,521 is a continuation under 35 U.S.C. § 120 of U.S. application Ser. No. 18/107,674, filed Feb. 9, 2023, now U.S. Pat. No. 11,810,411, issued Nov. 7, 2023. U.S. application Ser. No. 18/107,674 is a continuation under 35 U.S.C. § 120 of U.S. application Ser. No. 17/666,263, filed Feb. 7, 2022, now U.S. Pat. No. 11,580,805, issued Feb. 14, 2023. U.S. application Ser. No. 17/666,263 is a continuation under 35 U.S.C. § 120 of U.S. application Ser. No. 16/822,815, filed on Mar. 18, 2020, now U.S. Pat. No. 11,282,317, issued Mar. 22, 2022. This application incorporates by reference application Ser. Nos. 16/822,815, 17/666,263, 18/107,674, and 18/386,521 in their entireties.

FIELD OF THE DISCLOSURE

The present disclosure relates to systems and methods for access control, and more particularly to systems and methods for simultaneously controlling access to a secure facility and monitoring access to secure locations within that facility.

BACKGROUND OF THE INVENTION

Numerous applications exist where customers wish to store or receive property and other things in a secure location within a secure facility. These secure facilities typically include a plurality of secure locations within that facility, with each secure location corresponding to one or more different customers. Examples include a bank vault with safety deposit boxes, a self-storage facility with self-storage units, and a post office room with PO boxes.

Security for such facilities ordinarily includes two varieties, access control and intrusion detection, but features of the two are not integrated. Access control refers to techniques for controlling access to an area, such as by requiring a customer to possess a key or other credential to access the facility and then a key or credential (the same or different) to access his secure location within the facility. Intrusion detection refers to monitoring the facility to detect unauthorized access to the secure facility. Intrusion detection is not ordinarily performed for individual secure locations within the facility, nor is it integrated with the access control system.

For example, consider a bank vault with a plurality safety deposit boxes. In a typical installation, the bank vault has a plurality of safety deposit boxes that are accessible only by gaining access to the vault through a day gate. Most commonly, access control for the day gate is controlled by a bank employee who is responsible for authenticating a customer. Traditionally, authenticating a customer is performed manually, such as by authenticating a signature or by reviewing a customer's credentials (e.g. a driver's license). The day gate or another device May also collect a credential from the customer, such as a pin number, before allowing access to the vault. Once inside the vault, access control for each safety deposit box is traditionally controlled by two locks-a guard lock and a renter's lock. The guard lock for each safety deposit box is the same and corresponds to a key in the possession of the bank employee. The renter's lock, however, is specific to each safety deposit box and corresponds to a key (or keys) issued to the customer in connection with a lease for the safety deposit box. The bank employee therefore must enter the vault with the customer to verify that the customer is accessing her own safety deposit box and to unlock the guard lock for that box. The bank employee then typically leaves the vault to allow the customer privacy, but when the customer is done, the bank employee must return to lock the guard lock.

Intrusion detection for the bank vault is usually provided by an alarm system. The alarm system typically includes one or more sensors that detect whether some is attempting to open, or has opened, the day gate to the vault. Once armed, the intrusion detection system will trigger an alarm any time a sensor is tripped, regardless of whether the event is associated with a legitimate attempt to access the vault.

These existing systems for access control and intrusion detection have various drawbacks. As an initial matter, access control and intrusion detection are not coherently combined into a single system. Besides detecting intrusions into the vault itself, the intrusion detection system does not detect intrusions into specific safety deposit boxes. Thus, once an employee has opened the guard lock on a safety deposit box and exited the vault, nothing monitors whether the customer attempts to access a different, unauthorized safety deposit box.

Another drawback is that access control is typically manually intensive, for instance requiring a bank employee to be available for accessing the vault, enabling access to a safety deposit box, and re-locking the safety deposit box. Thus, customers wishing to access their safety deposit box may be delayed while waiting for an available employee, or banks must ensure an employee is dedicated to providing such access.

Furthermore, existing systems are unable to provide notifications to customers. For instance, a customer may be unaware that her safety deposit box has been accessed by someone—whether authorized or not-unless or until the customer discovers that something is missing from her box. Additionally, where multiple customers have access to a safety deposit box, the co-owners of the box may be unaware that another co-owner has accessed the box.

Another challenge is the ability to update or modernize existing installations of safety deposit boxes. Not only is it costly to replace an entire vault of existing safety deposit box units, but the logistics of doing so are difficult and inconvenient. Customers rely on the safety deposit boxes to store valuable and irreplaceable items, and they trust that no one except the customer will access their box. Thus, upgrading existing boxes requires a cumbersome process in which customers must come to the bank to vacate existing units. This process can be inconvenient, frustrating, and time consuming for the customer and bank.

Consequently, there is a need in the art for systems and methods for access control that do not suffer from these and other drawbacks. Preferably, the system and methods would allow for unattended access to the secure facility and secure locations. Even more preferably, the system and methods would integrate access control and intrusion detection and would provide intrusion detection features for the secure locations too. In some preferred embodiments, customers associated with a secure location are further notified about events related to someone accessing their respective secure location. In a specific embodiment, the systems and methods preferably enable retrofitting an existing secure facility without the need to replace existing equipment.

SUMMARY OF THE INVENTION

The present disclosure describes an access control system and methods for access control. Advantageously, the system and methods integrate access control and intrusion detection to provide unattended access to secure facilities having multiple secure locations associated with different users. Embodiments of the system and method also provide enhanced security, for instance providing notifications to customers whenever their respective secure locations are accessed. Furthermore, specific embodiments of the system and method allow for low-cost and convenient retrofitting of existing facilities that does not inconvenience customers. Embodiments of the invention may thus satisfy one or more, but not necessarily all, of the needs and capabilities described throughout this disclosure.

In some embodiments, a system for controlling access to a secure room containing a plurality of safety deposit boxes and having a gate for accessing the secure room comprises at least one motion detector located in the secure room and configured to detect motion associated with a person in the secure room; a biometric sensor disposed outside of the secure room and proximate to the gate; a plurality of contact sensors, wherein each sensor is associated with two of the safety deposit boxes, and wherein each of the plurality of safety deposit boxes is associated with at least two of the plurality of contact sensors; and a receiver in communication with each of the plurality of contact sensors. In a specific preferred embodiment, each of the plurality of contact sensors comprises a transmitter component and a magnetic component, and the transmitter component and magnetic component of each contact sensor are affixed to different safety deposit boxes. Even more preferably, the system includes a processor in communication with the at least one motion detector, the biometric sensor, and the receiver, wherein the processor is configured to unlock the gate when a plurality of access conditions are satisfied, wherein the access conditions include: collecting via the biometric sensor a biometric credential that matches a reference biometric credential in a user database; and determining the secure room is unoccupied based on at least a predetermined period of no motion detected by the at least one motion sensor; and the process is configured to generate a box-accessed event identifying one of the safety deposit boxes when all of the contact sensors associated with that safety deposit box are simultaneously open.

In another embodiment, a method for installing an access control system for an existing vault having an access gate and a plurality of safety deposit boxes comprises affixing a plurality of contact sensors to the plurality of safety deposit boxes, wherein each contact sensor comprises a transmitter component and a magnetic component, wherein the two components of each contact sensor are affixed to different safety deposit boxes, and wherein each safety deposit box is affixed with one of the components of at least two different contact sensors; installing a motion detector configured to detect the presence of a person inside said vault; and installing a biometric sensor located outside of and proximate to the access gate. Preferably, the method further comprises associating in a database each safety deposit box with each contact sensor having a component affixed to that safety deposit box, wherein each safety deposit box is associated with at least two contact sensors, and wherein a processor is programmed to generate a box-accessed event when every contact sensor associated with one of the safety deposit box is simultaneously open.

In yet another embodiment, a method for controlling access to a plurality of safety deposit boxes located in a secure room comprises monitoring for the presence of a person in the secure room; collecting a biometric credential and comparing the collected biometric credential to reference biometric credentials in a user database; and unlocking a gate to the secure room if a plurality of access conditions are satisfied, wherein the access conditions include: matching the collected credential to a reference biometric credential in the user database; and determining that the secure room is unoccupied based at least on a predetermined period of not detecting the presence of a person in the secure room. Preferably, the method further comprises generating a box-accessed event identifying one of said safety deposit boxes if every contact sensor associated with that safety deposit box is simultaneously open; identifying customer contact information in the user database associated with an active lease for the safety deposit box identified by the box-accessed event; and transmitting, in response to the box-accessed event, a notification using the customer contact information.

The above summary presents a simplified summary to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that follows.

DEFINITIONS

Figure 1:
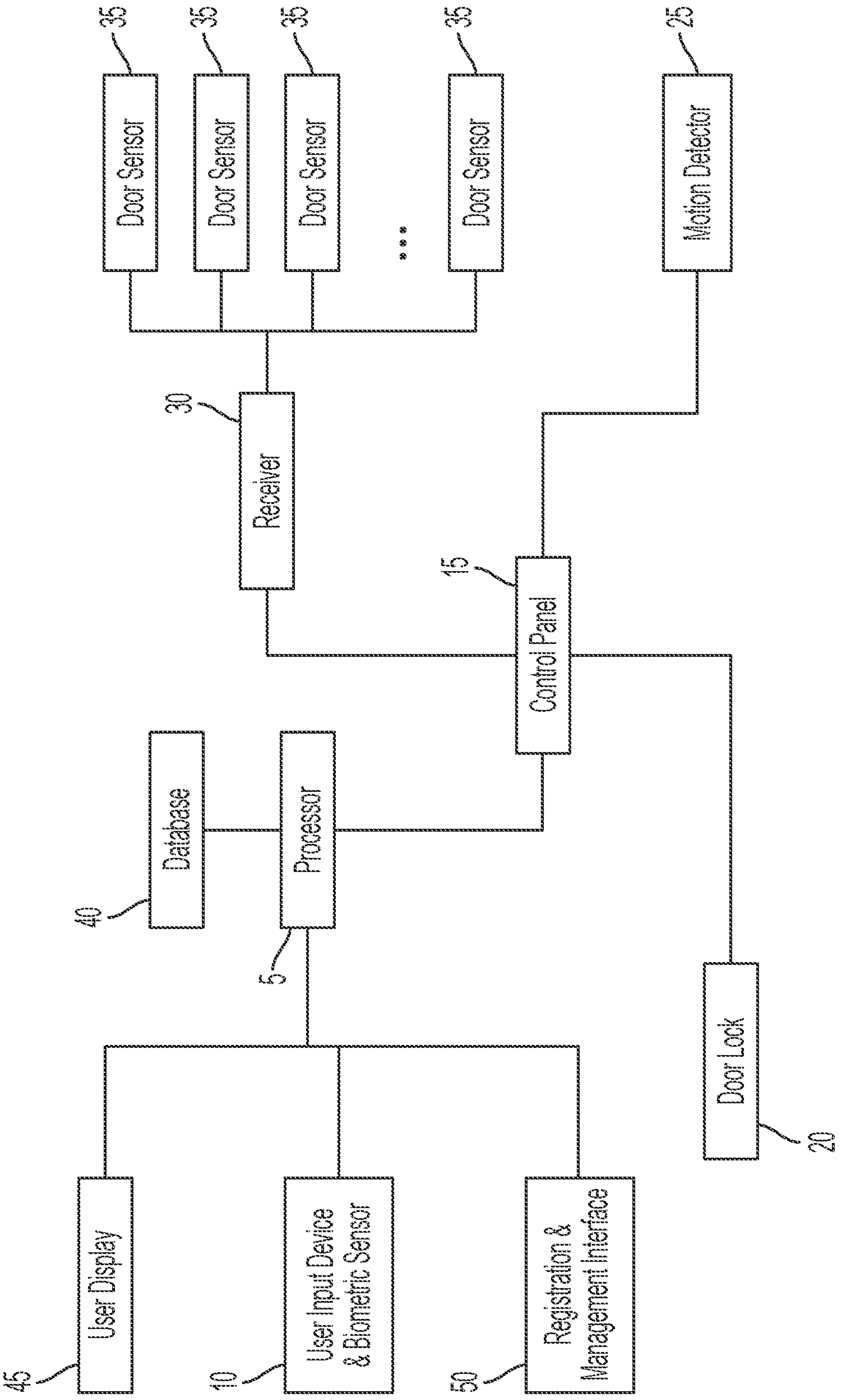
FIG. 1: A block diagram of one embodiment of the access control system.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an," and "the" are intended to include the plural forms as well, unless the context clearly indicates otherwise.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure. Likewise, terms such as "top" and "bottom" are used to distinguish certain features or elements from each other, but it is expressly contemplated that a top could be a bottom, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described are further intended to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

An improved access control system and methods for access control have been developed and are described. The access control system and methods are particularly advantageous for controlling access to safety deposit boxes in a bank vault, and embodiments of the access control system and methods are described in this disclosure specifically with reference to that application. But the teachings of this disclosure are not limited to such an application. Embodiments of the system and methods may be advantageous in any application where a secure facility houses a plurality of secure locations associated with different users. For instance, embodiments of the system and methods may be advantageous for use in a self-storage facility or in post office having post office boxes.

A. Exemplary Embodiments of the Access Control System

FIG. 1 provides a block diagram of an exemplary embodiment of the access control system. In this embodiment, the access control system comprises a processor 5, a user input device 10, a control panel 15, a door lock 20, a motion detector 25, a receiver 30, and a plurality of door sensors 35. The processor 5 is operably connected to the user input device 10, which preferably includes at least one biometric sensor. The user input device 10 is preferably located near the exterior of a day gate for a bank vault containing a plurality of safety deposit boxes. The processor 5 is also operably connected to the control panel 15, which is in turn operably connected to the door lock 20 and motion detector 25. The door lock 20 controls the ability to open the day gate, and the motion detector 25 is located in the bank vault to detect the presence of a person in the vault. Alternatively, in some embodiments, the processor 5 and the control panel 15 may be integrated into a single unit. The control panel 15 is also operably connected to the receiver 30. The receiver 30 is operable to receive signals from the plurality of door sensors 35. The plurality of sensors are installed on the plurality of safety deposit boxes in the bank vault. Preferably, the receiver 30 and plurality of door sensors 35 communicate wirelessly. Numerous variations of this embodiment are possible, which are further described below.

The processor 5 may be any suitable processor for performing the disclosed logical operations. In an exemplary embodiment, the processor 5 is a Windows PC and preferably an industrial PC, but the processor may also be, for instance, hosted via cloud computing. The processor 5 preferably has access to a database 40, which may be located on site, remotely, or both (e.g. a local database that is periodically backed up remotely). The database 40 includes various tables to store information, including but not limited to information related to users, safety deposit boxes, and various events. The processor 5 is also preferably coupled to one or more transceivers that allow the system to communicate with external devices or communicate over the intranet or internet. In some preferred embodiments, the processor 5 and other components of the system are connected to a backup power supply so that the system can function even when mains electricity is disrupted. The operation of the processor 5 and the contents of the database 40 are described in more detail below.

The control panel 15 may be any suitable panel for controlling the various peripheral devices (e.g. door lock 20, motion detector 25, and receiver 30) that are implemented in a given embodiment of the access control system. In an exemplary embodiment, the control panel 15 is a DMP XR550 panel. Alternatively, in some embodiments, the processor 5 and control panel 15 may be integrated into a single device that performs both the logical processing for the system and the controlling of the peripheral devices. If the processor 5 and control panel 15 are located on site, they are preferably located in a secure area (e.g. a locked closet) so that only authorized individuals may access the processor 5 and control panel 15. It is to be understood that the peripheral devices that may be connected to the control panel 15 are not limited to those specifically mentioned in this disclosure; the connected peripheral devices may include any devices used in connection with access control systems or intrusion detection systems. Some embodiments may include multiple control panels 15, such as where the number of peripheral devices exceeds the capacity of a single panel.

The user input device 10 is any device suitable for collecting the desired credentials from users seeking to access the bank vault. Examples of potential credentials that may be collected include a user ID, a PIN code, a password, a signature, and one or more biometric credentials. Preferably, the user input device 10 includes at least one biometric sensor for collecting a biometric credential, such as a fingerprint reader, an iris scanner, a facial recognition camera, a hand or palm scanner, a voice detector, etc. In a specific exemplary embodiment, the user input device 10 is a keypad having a fingerprint reader, such as a ZKTeco F22 Fingerprint Reader. In some embodiments, the user input device 10 may include an integrated display for communicating information to a user. But in other embodiments, a separate user display 45 is located proximate to the user input device 10. The user display 45 is operably connected to the processor 5 and communicates information to the user. For instance, the user display 45 may display messages about when the vault is occupied, when the vault is available to be accessed, when the user's credentials have been verified, or when an error has occurred. The display may also communicate audible messages. The user display 45 may also include a user interface, such as a touch screen, to collect additional information from the user. In an exemplary embodiment, the user display 45 is an ICP TPD-283-H Touchscreen Display.

The door lock 20 may be any suitable device for controlling ingress and egress through the day gate. In an exemplary embodiment, the door lock 20 is an electromagnetic door lock. In some embodiments, a plurality of door locks 20 may be used.

The motion detector 25 is any device suitable for detecting the presence of a user in the vault. Preferably, the motion detector 25 is installed in a location and orientation that allows it to detect motion throughout the vault. In some embodiments, such as where a vault is large or where obstructions prevent a single motion detector 25 from sensing motion throughout the vault, a plurality of motion detectors 25 may installed in the vault. In an exemplary embodiment, the motion detector 25 is a DMP motion detector, but the motion detector may be any industry standard motion detector. Alternatively, instead of (or in addition to) a motion detector, another type of sensor may be used to detect the presence of a user within the vault. Examples of such sensors include an infrared sensor or a camera.

The receiver 30 may be any device suitable for use with the corresponding plurality of door sensors 35. Preferably, the receiver 30 communicates wirelessly with the door sensors 35. In some embodiments, such as if the size of the vault is greater than the range of a single receiver 30 or if the number of sensors exceeds the capacity of a single receiver 30, multiple receivers 30 may be used. In an exemplary embodiment, the receiver 30 is a DMP 1100 Wireless Receiver.

The plurality of door sensors 35 may be any suitable devices for detecting whether the door to a safety deposit box is open. In a preferred embodiment, the door sensors 35 are contact sensors, where each contact sensor comprises a transmitter component 55 and a magnetic component 60. The transmitter component transmits signals to the receiver 30 and may be powered by a battery. The transmitter component typically includes a first reed switch, but another magnetic field sensor may be used. When the transmitter component 55 is in close proximity to the magnetic component 60, the magnetic field of the magnetic component 60 causes the first reed switch of the contact sensor to be closed. When the magnetic component 60 and transmitter component 55 are separated, the first reed switch of the contact sensor is open and the transmitter component 55 transmits a signal to the receiver 30 indicating that the contact sensor is open. In one preferred embodiment, the plurality of contact sensors are DMP 1107 Micro Window Transmitters, DMP 1106 Universal Transmitters, or a combination of the two.

Some embodiments may use contact sensors that include a second reed switch, which May be used to detect individuals attempting to bypass the access control system. In such embodiments, the second reed switch is preferably disposed in the housing of the transmitter component 55 and configured such that it will not cycle between the open and closed state based on the proximity of the magnetic component 60. Instead, the second reed switch will detect the presence of an external magnetic force, such as an individual holding a magnet in proximity to the transmitter component 55 so as to deceive the first reed switch into staying closed even when the transmitter component 55 and magnetic component 60 are physically separated (e.g. when someone opens the door on which one of the components is installed). The transmitter component 55 may be configured to transmit signals indicating the opened or closed state of the second reed switch. In embodiments that use contact sensors with a second reed switch, only some of the contact sensors may include this second reed switch.

Figure 2:
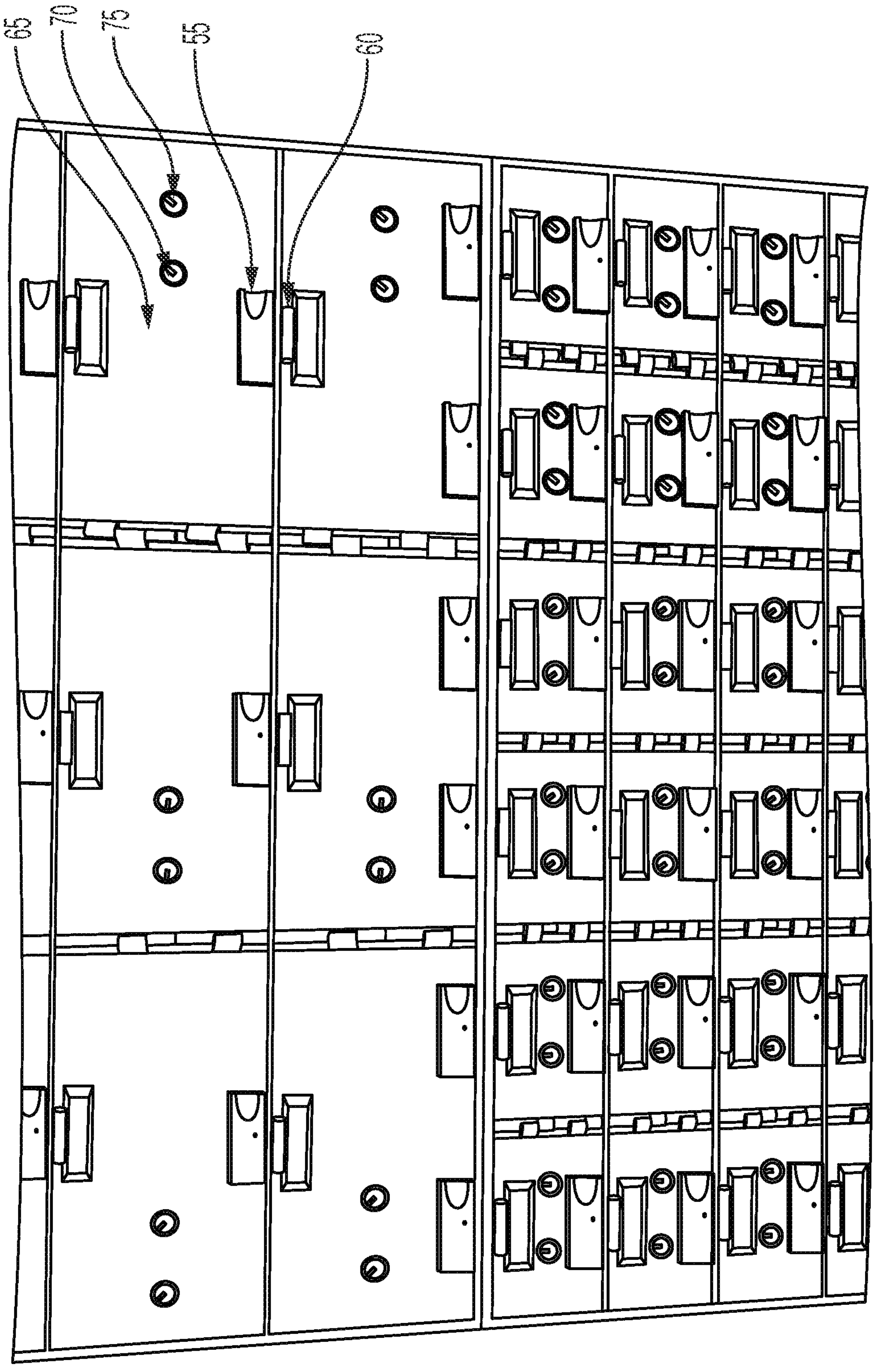
FIG. 2: A front view of a plurality of safety deposit boxes on which a plurality of contact sensors have been installed in accordance with one embodiment of the access control system.

In a preferred embodiment, the plurality of contact sensors are installed on the exterior of the safety deposit boxes. An exemplary preferred embodiment of this installation is depicted in FIG. 2. In this embodiment, for at least a plurality of the safety deposit boxes, at least two contact sensors are associated with each box. Because of the proximity of the doors for each of the safety deposit boxes (there is no appreciable door frame), the transmitter component 55 and the magnetic component 60 may each be installed on a different respective safety deposit box door 65. Thus, the contact sensor is associated with two different safety deposit boxes, meaning that the contact sensor detects that it is open both when the door associated with the transmitter component 55 is open and when the door associated with the magnetic component 60 is open. As a result, unlike in typical installations of contact sensors where a sensor is associated with a single door, the sensor open signal from a single contact sensor cannot establish which of two safety deposit boxes is actually open. Accordingly, each safety deposit box is associated with at least two contact sensors (generally speaking, in this embodiment, the number of sensors associated with a safety deposit box corresponds to the number of safety deposit boxes that are immediately above and immediately below the subject safety deposit box). The association between each contact sensor and each safety deposit box is programmed into the system. Thus, using the known associations between pluralities of sensors and pluralities of safety deposit boxes, when the door to a safety deposit box is opened, the access control system can determine which box is open based on which two or more sensors transmit sensor open signals.

Furthermore, in embodiments that associate at least two contact sensors with each safety deposit box, preferably at least one of the two (or more) contact sensors has a second reed switch.

The foregoing sensor configuration has numerous advantages. It allows for easy retrofitting of the access control system in existing installations of safety deposit boxes.

Because the sensors are installed on the exterior of the safety deposit boxes, the system can be installed without inconveniencing customers. Furthermore, this installation configuration addresses another problem associated with existing security boxes, namely that they do not have a large enough frame around each safety deposit box door to accommodate the magnetic component of the contact sensor. Additionally, associating multiple sensors with each safety deposit box adds an additional layer of security to the system. For one, it makes it more challenging for a malicious user to circumvent or hack the system because multiple sensors must be overcome. Additionally, the access control system may be programmed to transmit an alarm when an unusual pattern of sensors transmit open signals. Such an unusual pattern of open signals may include only one sensor being open, which may indicate a malfunction in that sensor or an adjacent sensor or may indicate a user tampering with the sensor, or when non-adjacent sensors are open, which may indicate that multiple safety deposit boxes are simultaneously open. The use of contact sensors is also advantageous because it ensures that a sensor open signal is transmitted only if a safety deposit box is in fact opened; thus, if a customer inadvertently, but unsuccessfully, attempts to open the wrong box, no alarm is triggered.

Alternatively, in some embodiments the contact sensors may be installed inside of the safety deposit boxes or may be integrated into the safety deposit boxes. For instance, the transmitter component 55 may be installed on an interior wall of the safety deposit box and the magnetic component 60 may be installed on the interior of the door, or vice versa. As a further alternative, in other embodiments, the door sensors 35 may be another type of sensor, such as a motion sensor or a touch sensor.

The access control system may also comprise a registration and management interface 50. The registration and management interface 50 allows for managing the access control system, including by configuring the association between door sensors and safety deposit boxes, registering customers and their credentials, associating customers with a leased safety deposit box, reviewing notifications generated in response to events, and auditing event logs of the system. In some embodiments, the registration and management interface 50 is a web interface, which May be accessible via a bank's internal network. Employees of the bank therefore may access the interface 50 via the computers at their work stations. Alternatively, the registration and management interface 50 may be hosted in other ways, such as on a dedicated computer or via the internet. In some embodiments, there may be a separate configuration interface that is only accessibly by certain system technicians.

B. Installation of the Access Control System

Embodiments of the access control system advantageously may be installed in existing secure facilities, such as an existing bank vault containing a plurality of existing safety deposit boxes. Because of the design of the system, existing facilities may be retrofitted with an embodiment of the access control system for relatively small cost and effort. The following section describes an exemplary process for installing an embodiment of the access control system. It is to be understood that this process is merely exemplary and that different combinations of steps, which may exclude certain steps or include additional steps, may be performed as well.

In embodiments where the processor 5 is housed on site, the installation may begin by installing a suitable processor 5 and a suitable control panel 15 in or near the security facility. Preferably, these components are located in a protected space, such as a locked closet or a locked cabinet.

The installation of the system may also include installing a suitable user input device 10, preferably including at least one biometric sensor, and a door lock 20. The user input device 10 is typically installed immediately adjacent to the exterior of the day gate so that users can open the door once their credentials have been validated. In some embodiments, an existing door lock 20 may be used if it is compatible with the system. Depending on the door lock 20 and the system, various devices or sensors may also be installed on the interior of the vault to enable egress from the vault. A user display 45 may also be optionally installed in close proximity to the user input device 10.

A motion detector 25 may also be installed inside of the vault. Preferably, the location of the motion detector 25 is selected so that it can detect motion throughout the vault or at least detect motion in the areas where customers will be opening and accessing the contents of their safety deposit boxes.

Door sensors 35 are preferably installed on the plurality of safety deposit boxes. In a preferred embodiment, the door sensors 35 comprise contact sensors having a transmitter component 55 and a magnetic component 60. Preferably, for a plurality of the contact sensors, the transmitter component 55 is installed on the exterior of the door to a first safety deposit box and the magnetic component 60 is installed on the exterior of the door to a second safety deposit box that is immediately adjacent to (e.g. below or above) the first safety deposit box. The contact sensors may be affixed using any suitable attachment means, such as an adhesive or a fastener. The transmitter component 55 and magnetic component 60 of each contact sensor must be installed in sufficient proximity so that, when both safety deposit boxes are closed, the contact sensor detects that it is closed. The contact sensors must also be sufficiently spaced so that the magnetic component of one sensor does not affect the switch in a transmitter component of another sensor. For safety deposit boxes at the bottom (or top) of a cabinet, one of the contact sensors associated with that box may include a transmitter component 55 or a magnetic component 60 that is installed on another surface (e.g. a cabinet frame) because there is no safety deposit box immediately below (of above) that box.

At least one suitable receiver 30 may be installed. Depending on the characteristics of the receiver 30 and door sensors 35, the receiver 30 may be installed inside of the vault to maximize the reception of signals from the door sensors 35, or the receiver 30 may be installed in another location to increase security.

Optionally, the installation process may also include disabling the guard lock 70 on each safety deposit box. Recall that conventional safety deposit boxes are secured by both a guard lock 70 and a renter's lock 75 (see FIG. 2) that must be simultaneously unlocked to open the safety deposit box. A bank employee is conventionally responsible for locking and unlocking the guard lock 70. Because the access control system eliminates the need for supervision by a bank employee, an operational guard lock 70 may be unnecessary and lessen some of the benefits of the access control system. Therefore, the guard lock 70 is preferably disabled in some embodiments of the system. For instance, the guard lock 70 may be disabled by completely removing the guard lock 70, or in other embodiments, the guard lock 70 may be disabled by leaving a guard key in each guard lock 70 or by affixing the guard lock 70 in the open position.

After or while the various components are physically installed, the installation process May also include configuring the system. In an exemplary embodiment, the registration and management interface 50 (or a separate configuration interface) includes various interfaces or pages for configuring the system.

An exemplary first step for configuring the system during installation is defining the collection of safety deposit boxes that are in the vault. The database 40 may include a table that stores relevant information about each safety deposit box, such as its box number, dimensions, and location (e.g. cabinet number and row and column identifier).

Another step may include defining the collection of door sensors 35 installed in the vault. The database 40 may include a table that stores relevant information about each door sensor, such as a unique identifier, sensor type (e.g. brand and model of sensor), and installation date.

The configuration process also preferably includes a step at which each safety deposit box is associated with one or more door sensors 35. The sensors 35 that are associated with each safety deposit box are based on which sensors have a component 55 or 60 affixed to the door of that safety deposit box. As mentioned above, each safety deposit box, or at least a plurality of the safety deposit boxes, is preferably associated with at least two door sensors 35. The database 40 preferably includes a table that stores the relevant information that associates each safety deposit box with its corresponding sensor(s). For instance, each entry in the table may include fields for box number and unique sensor ID, thus defining an association between the two objects.

In addition, the configuration process may also include configuring other parameters of the system. In some embodiments of the system, the configuration process includes defining the user credentials and other access conditions that are required to unlock the door lock 20, defining the parameters for determining whether the vault is occupied, defining the actions to take when an unusual event or an error occurs, and defining the users or other objects that receive notifications about system events.

C. Operation of the Access Control System

Advantageously, the access control system allows customers to have secure access to a secure facility, such as a bank vault housing a plurality of safety deposit boxes, without supervision by employees of the facility. Various methods of operating embodiments of the access control system are described in this section. It is to be understood that that the following description is merely exemplary and that embodiments of the system may have some, but not necessarily all, of the following features.

One exemplary method includes registering a customer and associating that customer with a lease for a safety deposit box. As a first step, a customer is added to the database 40. Preferably, the registration and management interface 50 includes an interface or page(s) for registering a new customer. The database 40 may include a user table that stores relevant information about each user, such as a unique user ID, first and last name, user name, PIN, password, customer status, customer contact information (e.g. email address, phone number, etc.).

The system may also collect one or more biometric credentials for the customer. For instance, after adding the customer using the registration and management interface 50, the system may prompt the customer to visit the user input device 10 having one or more biometric sensors. The customer may then be prompted to allow the system to collect the user's biometric credentials (e.g. a fingerprint), which are stored in the same or a related table in the database 40.

After a customer has been registered, the customer may be associated with a lease to one or more safety deposit boxes. Again, the registration and management interface 50 preferably includes an interface or page(s) for associating the customer with a lease to safety deposit boxes. In a preferred embodiment, the system may collect information such as the user's identifier, the box identifier, and the duration of the lease. The database 40 preferably has one or more tables to store relevant information about the lease. In some embodiments, the system may also allow for defining leases with special characteristics, such as where multiple customers are permitted to access a box or where multiple customers are required to access a box.

In operation, the access control system constantly monitors to determine whether the vault is occupied. In an exemplary embodiment, the occupied status of the vault is determined, at least in part, using a motion detector 25. For instance, the processor 5 may receive a signal from the control panel 15 whenever the motion detector 25 detects motion. When motion is detected, the processor 5 may be programmed to determine that the vault is occupied. After a certain period of time (for instance, 30 second, 1 minute, or 5 minutes) without receiving a motion-detected signal, the processor 5 may be programmed to determine that the vault is unoccupied. In addition or alternatively, the processor 5 may also collect input associated with the door lock 20 to determine whether the vault is unoccupied. For instance, if the processor detects that the day gate has been opened while the vault was in an occupied state, the processor may wait for a shorter period of time (e.g. 5 or 10 seconds) before determining that the vault is now in an unoccupied state. Additionally, in some embodiments, if the vault is occupied but the motion detector 25 ceases to detect motion and the system has not detected a customer exiting through the day gate, the processor 5 may be programmed to send a notification to an administrator to check on the welfare of the customer in the vault.

In a preferred embodiment, a customer may request access to the vault by inputting one or more required user credentials, which preferably include at least one biometric credential, at the user input device 10. The user input device 10 collects the user credential(s) and transmits them to the processor 5. The processor 5 compares the collected user credential(s) to the user credential(s) stored in the database 40. If the user credential(s) matches a set of user credential (s) that is associated with a customer in the user database, the processor 5 determines that the customer is authorized access to the vault. However, before unlocking the door lock 20, the processor 5 may verify that one or more other access conditions are satisfied. Examples of potential access conditions include determining whether the vault is unoccupied, determining whether the customer is associated with an active lease, determining whether all safety deposit boxes in the vault are closed, and determining whether the customer's lease requires that other customers are present to access the associated safety deposit box. Provided that each applicable access condition is satisfied, the processor 5 transmits a signal to unlock the door lock 20. Preferably, the processor 5 is programmed to keep the door lock 20 unlocked for a predefined period of time, such as five seconds. When the customer opens the door and enters the vault, the motion detector 25 detects the motion and, based on that signal, the processor 5 determines that the vault is occupied. Preferably, the processor 5 stores information identifying the customer, such as the user ID of the customer, who has accessed the vault. This information may be stored in a temporary memory or, more preferably, may be stored in an event log in the database 40. As further discussed below, the information about the customer in the vault is used to analyze information during the customer's session in the vault.

On the other hand, if one or more access conditions is not satisfied, the processor 5 does not allow access to the vault. In embodiments that include a user display 45, the processor 5 may display one or more messages that inform the customer of the reason that access was denied. For instance, if the vault is currently occupied, the user display 45 may display a message that states "Vault Occupied. Please Wait." Besides displaying messages in response to a user's attempt to access the vault, the processor 5 may also cause the user display 45 to display messages about the status of the system. For instance, the user display 45 may always include an output that indicates whether the vault is occupied. The user display 45 may also display messages in response to errors or other conditions detected by the processor 5.

Once a customer is inside the vault, the customer may access one or more safety deposit boxes. Conventionally, a customer accesses a safety deposit box using a key to unlock the renter's lock 75, but in some embodiments, another means may be used to access a safety deposit box, such as a keypad or a combination lock. Regardless of the exact means, when a user opens the door to the safety deposit box, the contact sensors associated with that safety deposit box are opened, and their transmitter components 55 transmit a sensor-open signal to the receiver 30. When the control panel 15 receives a sensor-open signal, it transmits a signal to the processor 5 that indicates which sensors are open. The processor 5 processes this information, and using the information stored in the database 40 that associates each security box with respective contact sensors, the processor 5 executes logic to determine which safety deposit box has been opened. Once the open safety deposit box has been identified, the processor 5 includes logic to determine, again using the database 40, whether the customer that was granted access to the vault has an active lease for the safety deposit box that was opened.

The processor 5 may be programmed to execute various logic depending on whether the customer is authorized to access the open safety deposit box. For instance, if the customer is not authorized, the processor 5 may be programmed to send a notification or a silent alarm to an administrator, such as one or more bank employees, and also log such event in a table in the database 40. In addition, the processor 5 may be programmed to send a notification, such as an email or text message, to one or more customers who own the lease associated with the open safety deposit box, thus alerting the customers that their box has been opened. In some instances, the processor 5 may also be programmed to generate an audible alarm in response to an unauthorized access, and in some instances, at least temporarily prevent the customer's egress from the vault. Alternatively, if the customer is authorized, the processor 5 may still be programmed to log an event in a table in its database 40. In addition, in some preferred embodiments, the processor 5 is programmed to generate a notification to all customers who own a lease whenever their safety deposit box is opened, even if the processor 5 determined that the individual opening the box was authorized to do so. Such a notification provides an additional level security in the event that a malicious individual somehow spoofs the credentials of an authorized user. In addition, in embodiments where multiple customers may lease a single box, such notifications ensure that all customers associated with a lease are informed whenever another co-owner of the lease accesses the box.

After a customer is finished accessing the safety deposit box, the customer should close the door to the safety deposit box and relock it. When the door is closed, the associated contact sensors are also closed and transmit a sensor-closed signal to the receiver 30. Whenever the control panel 15 receives a sensor-closed signal, it transmits a signal to the processor 5 that indicates which sensors have been closed. The processor 5 processes that information and determines which security box has been closed. The processor 5 then updates its memory or the database 40 to indicate the closed status of the safety deposit box. In the event that a customer attempts to exit the vault without closing her safety deposit box, the processor 5 may be programmed to signal an alarm to warn the customer that her safety deposit box is open. Optionally, if the vault is exited with a safety deposit box still open, the processor 5 may be programmed to transmit a notification to an administrator, such as a bank employee. The processor 5 may also be programmed to deny further access to the vault until all safety deposit boxes are closed.

The processor 5 may also be configured to monitor for unusual conditions in the system. For instance, in embodiments where at least two sensors are associated with every safety deposit box, an unusual condition would exist if only a single sensor transmits a sensor-open signal. Likewise, if multiple contact sensors transmit a sensor-open signal but the sensors are not associated with a common box, another unusual condition would exist. In the event of such conditions, the processor 5 may be programmed to generate an alarm or transmit a notification to an administrator.

While the invention has been described with respect to a limited number of embodiments, those skilled in the art, having benefit of this disclosure, will appreciate that other embodiments can be devised which do not depart from the scope of the invention as disclosed.

I claim:

1. A system for monitoring access to a plurality of secure locations having adjacent doors, said system comprising:
- a plurality of door sensors, wherein each of said plurality of door sensors is associated with two of said plurality of secure locations, and wherein each of said plurality of secure locations is associated with at least two of said plurality of door sensors; and
- a processor in communication with said plurality of door sensors, wherein said processor is configured to generate an unusual-pattern event when at least one unusual-pattern condition exists, wherein said unusual-pattern conditions include:
  - a first door sensor and a second door sensor are open and are not associated with a common secure location; or
  - only a single door sensor of said plurality of door sensors is open.

2. The system of claim 1, wherein each of said plurality of door sensors is a contact sensor comprising a first component and a second component, wherein the first component and the second component of each sensor are affixed to different secure locations.

3. The system of claim 2, wherein each first component is a transmitter component that has a first reed switch and each second component is a magnetic component, wherein the transmitter component of at least one of said plurality of contact sensors includes a second reed switch, and wherein said processor is further configured to generate a tampering event when one of said second reed switches detects a magnetic field.

4. The system of claim 1, wherein said processor is further configured to generate a location-opened event identifying one of said secure locations when at least one location-opened condition is satisfied, wherein said location-opened condition includes:

each of said at least two door sensors associated with one of said secure locations is simultaneously open.

5. The system of claim 1, wherein a gate controls access to a secure room containing at least two of said plurality of secure locations, the system further comprising:

at least one sensor located in said secure room and configured to detect the presence of a person in said secure room; and a user input device disposed outside of said secure room and proximate to said gate, wherein said processor is in communication with said at least one sensor and said user input device and is further configured to unlock said gate when a plurality of access conditions are satisfied, wherein said access conditions include:

collecting via said user input device a credential that matches a reference credential in a user database; and determining said secure room is unoccupied based on at least a predetermined period of no presence detected by said at least one sensor.

6. The system of claim 5, wherein said plurality of access conditions further include determining that each of said plurality of door sensors is closed.

7. A system for monitoring access to a plurality of secure locations having adjacent doors, said system comprising:

a plurality of door sensors, wherein each of said plurality of door sensor is associated with two of said plurality of secure locations, and wherein each of said plurality of secure locations is associated with at least two of said plurality of door sensors; and a processor in communication with said plurality of door sensors, wherein said processor is configured to generate a location-opened event identifying one of said secure locations when at least one location-opened condition is satisfied, wherein said location-opened condition includes:

each of said at least two door sensors associated with one of said secure locations is simultaneously open.

8. The system of claim 7, wherein each of said plurality of door sensors is a contact sensor comprising a first component and a second component, wherein the first component and the second component of each sensor are affixed to different secure locations.

9. The system of claim 8, wherein each first component is a transmitter component that has a first reed switch and each second component is a magnetic component, wherein the transmitter component of at least one of said plurality of contact sensors includes a second reed switch, and wherein said processor is further configured to generate a tampering event when one of said second reed switches detects a magnetic field.

10. The system of claim 7, wherein a gate controls access to a secure room containing at least two of said plurality of secure locations, the system further comprising:

at least one sensor located in said secure room and configured to detect the presence of a person in said secure room; and a user input device disposed outside of said secure room and proximate to said gate, wherein said processor is in communication with said at least one sensor and said user input device and is further configured to unlock said gate when a plurality of access conditions are satisfied, wherein said access conditions include:

collecting via said user input device a credential that matches a reference credential in a user database; and determining said secure room is unoccupied based on at least a predetermined period of no presence detected by said at least one sensor.

11. The system of claim 7, wherein said processor is configured to generate an unusual-pattern event when at least one unusual-pattern condition exists, wherein said unusual-pattern conditions include:

a first door sensor and a second door sensor are open and are not associated with a common secure location; or only a single door sensor of said plurality of door sensors is open.

12. A system for monitoring access to a secure room containing a plurality of secure locations and controlling access to a gate restricting access to said secure room, said system comprising:

at least one sensor located in said secure room and configured to detect the presence of a person in said secure room;

a user input device disposed outside of said secure room and proximate to said gate; and a processor in communication with said at least one sensor and said user input device, wherein said processor is configured to ∞ unlock said gate when a plurality of access conditions are satisfied, wherein said access conditions include:

collecting via said user input device a credential that matches a reference credential in a user database; and determining said secure room is unoccupied based on at least a predetermined period of no presence detected by said at least one sensor.

13. The system of claim 12 further comprising:

a plurality of contact sensors, wherein each said sensor is associated with one of said plurality of secure locations and the contact sensor is open when the associated secure location is open, wherein said processor is further configured to generate a location-accessed event identifying one of said plurality of secure locations when at least one location-access condition occurs, wherein said location-access condition includes the associated contact sensor is open.

14. The system of claim 13, wherein said access conditions include:

determining that each of said plurality of contact sensors is closed.

15. The system of claim 13, wherein each of said plurality of contact sensors comprises a transmitter component that has a first reed switch and a magnetic component, wherein the transmitter component of at least one of said plurality of contact sensors includes a second reed switch, and wherein said processor is further configured to generate a tampering event when one of said second reed switches detects a magnetic field.

16. The system of claim 13, wherein said plurality of secure locations have adjacent doors, wherein each of said plurality of contact sensors is associated with two of said plurality of secure locations, and wherein each of said plurality of secure locations is associated with at least two of said plurality of contact sensors, wherein said location-access condition includes that the at least two of said plurality of contact sensors associated with one of said plurality of secure locations are open.

17. The system of claim 13, wherein said processor is further configured to generate an unusual-pattern event when at least one unusual-pattern condition exists, wherein said unusual-pattern conditions include:

a first and second of said plurality of contact sensors are open and are not associated with a common secure location; or only a single contact sensor of said plurality of contact sensors is open.

18. The system of claim 12, wherein said access conditions further include determining that the matched reference credential is associated with an active lease in said user database for at least one of said plurality of secure locations.

19. The system of claim 18, wherein said access conditions further include determining said active lease does not require multiple users to access said leased secure location.

* * * * *